Patented July 16, 1946

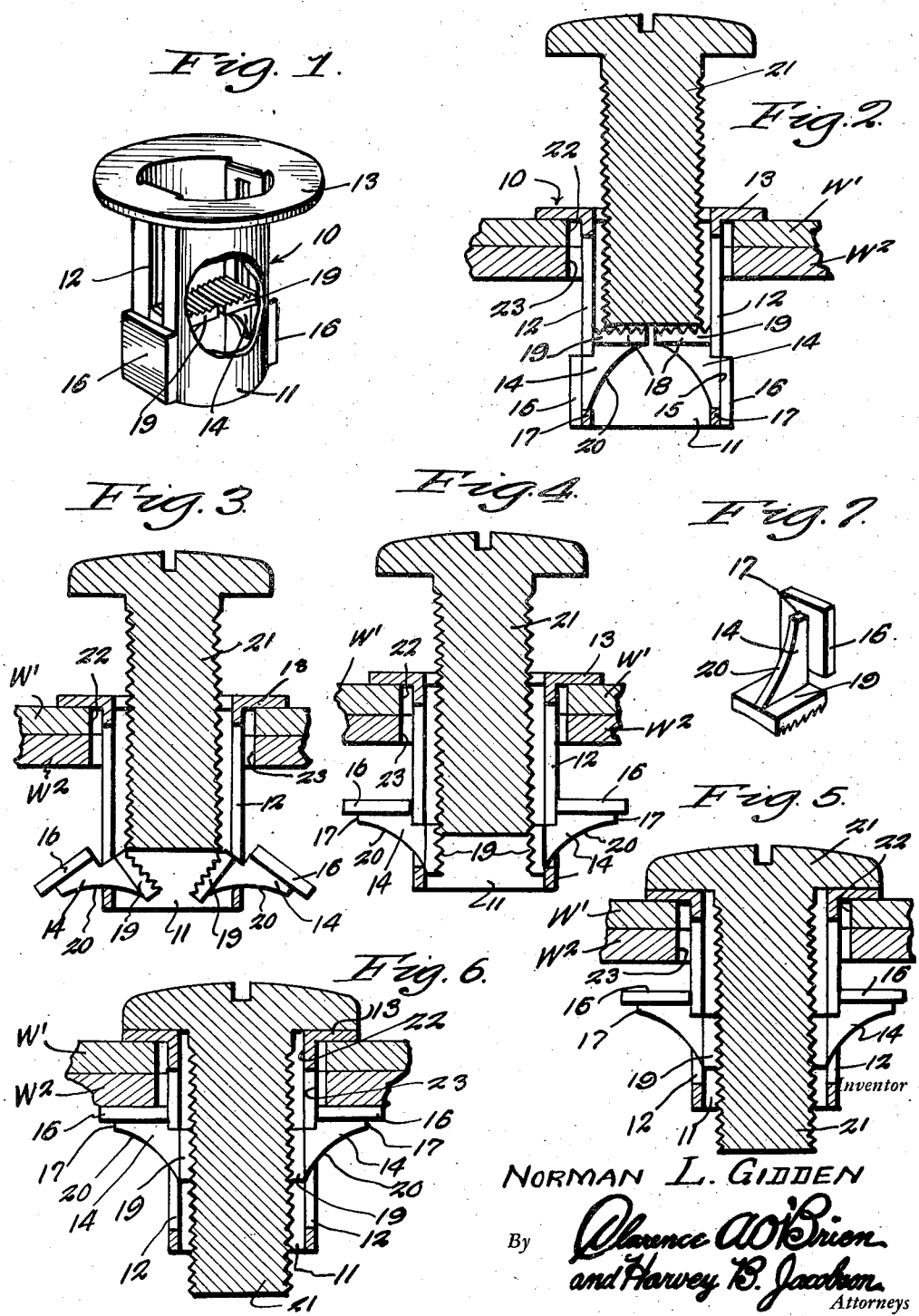

2,404,169

UNITED STATES PATENT OFFICE 2,404,169

FASTENER

Norman L. Gidden, New York, N. Y.

Application August 14, 1945, Serial No. 610,719

5 Claims. (Cl. 85—3)

1

This invention relates to an improvement in fasteners and more particularly those adapted for use in clamping two abutting surfaces together, as for example, in clamping light thin sheet metal parts such as are commonly employed in the aircraft industry.

The primary object of the invention is to facilitate the clamping together of abutting surfaces with rapidity and to avoid the awkward and inconvenient methods heretofore employed which necessitated holding a nut on one side while endeavoring to tighten a screw from the opposite side of the work to be clamped.

Another object is to insure a rigid and secure junction of the part which is not liable to become loosened through vibration and shock, thus insuring its permanency.

Still another object is to facilitate the removal of the fastening device should it become necessary in order to make repairs or alterations in the original structure.

The above and other objects may be attained by employing my invention which embodies among its features a tubular shell which is adapted to be thrust through an opening drilled in the parts to be clamped and having slidably mounted therein at spaced circumferential points clamp jaws which during the insertion of the device lie substantially parallel with the longitudinal axis of the shell but which when a screw is inserted into the interior of the shell will be moved to a position perpendicular to the axis thereof so that upon turning the screw the jaws will be advanced toward a stop carried by the end of the shell through which the screw is thrust.

Other features embody a substantially triangular slide adapted to project through each of the longitudinal slats carrying at its outer side the clamp jaw and at its inner side a threaded segment which is adapted to partially embrace the screw with the movement of the clamp jaws into their operating position.

In the drawing:

Figure 1 is a perspective view of a fastener embodying the features of my invention showing portions broken away to more clearly illustrate the details of construction;

Figure 2 is a longitudinal sectional view through a fastener showing the same positioned within the work to be clamped and illustrating the fastener actuating screw being entered into the fastener;

Figure 3 is a view similar to Figure 2 showing the manner in which the screw moves the clamp

2 jaws into a position perpendicular to the longitudinal axis of the fastener;

Figure 4 is a view similar to Figure 3 showing the screw-threaded segments engaged with the extreme inner end of the screw;

Figure 5 is a view similar to Figure 4 showing the clamped jaws partially advanced toward the work to be clamped and Figure 6 is a view similar to Figure 5 showing the jaws in work clamping position.

Figure 7 is a perspective view of one of the details.

Referring to the drawing in detail, my improved fastener designated generally 10 comprises a tubular shell 11 which is formed with circumferentially spaced longitudinally extending slots 12. In the present example two such slots are shown at diametrically opposed points though it is to be understood that any number of such slots may be used. Formed integrally with the outer end of the shell 11 is an outstanding annular flange 13 forming a stop for engagement with the outer face of the outer work piece W1 (Figure 2). Slidably mounted in each slot 12 is an angular guide 14 carrying on its outer edge 15 a clamp member which, as illustrated, is adapted to slide on the outer face of the shell 11 adjacent each slot 12. As will be seen in Figures 2 and 7, the clamp member 16 extends slightly beyond the end of the face 15 to form a shoulder 17 for engagement with the inner end of its respective slot 12 as illustrated in Figure 2 when the fastener is being inserted into the openings formed in the work. Carried by the edge 18 of the angular guide 14 which extends perpendicular to the edge 15 thereof is a threaded segment 19 which when the fastener is to be inserted in the work lies in a plane substantially concentric with the longitudinal axis of the shell 11. An angular edge 20 extends between the edges 15 and 18 and forms a cam surface which rides upon the inner edge of the bottom end of the slot 12 as illustrated in Figure 3 when the clamping screw 21 is entered into the shell 11 from the end carrying the flange 13.

In use, the work W1 is provided with an opening 22 which is adapted to align with an opening 23 formed in an abutting piece of work W2. The shell 11 is then thrust through the openings 22 and 23 as shown so that the flange or stop 13 engages the outer face of the outer work piece W1. The screw 21 is then introduced into the shell from its flanged end and the point of the screw moved inwardly until it engages the threaded segments carried by the angular guides 14 as illustrated in Figure 2. Continued inward pressure on the part of the screw 21 will cause the shoulders 17 to be disengaged from the bottom ends of the slots 12 so as to move the angular guides, clamp members and threaded segments into the position illustrated in Figure 3, and finally into the position shown in Figure 4 so that the clamp members 16 lie perpendicular to the longitudinal axis of the shell while the threaded segments lie concentric thereto and in embracing position with relation to the screw 21. Upon turning the screw in the ordinary manner, the threaded segments will be caused to travel along the surface thereof so as to move the angular guides and clamping members toward the work W2 into final clamping position as illustrated in Figure 6. It is obvious that by using this fastener the awkward and inconvenient task of holding a nut on the inner end of a fastening screw is avoided. Obviously should it be so desired the screw may be turned in a reversed direction to move the clamp members out of engagement with the work for the purposes of repair or readjustment.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. A fastener comprising a tubular shell having circumferentially spaced longitudinally extending slots, an outstanding stop at one end of the shell, a clamp member pivotally and slidably mounted on the outer face of the shell adjacent each slot and carried by each clamp member, means adapted to cooperate with a screw entered into the interior of the shell from the end carrying the stop to move the clamp members into a position perpendicular to the longitudinal axis of the shell and advance them toward the stop as the screw is turned.

2. A fastener comprising a tubular shell having circumferentially spaced longitudinally extending slots, an outstanding stop at one end of the shell, a clamp member pivotally and slidably mounted on the outer face of the shell adjacent each slot and carried by each clamp member, a threaded segment adapted to cooperate with a screw entered into the interior of the shell from the end carrying the stop to move the clamp members into a position perpendicular to the longitudinal axis of the shell and simultaneously partially embrace the screw whereby when the screw is turned the clamp members may be advanced toward the stop.

3. A fastener comprising a tubular shell having circumferentially spaced longitudinally extending slots, an outstanding annular flange at one end of the shell forming a stop against which work to be held is adapted to be engaged, a clamp member pivotally and slidably mounted on the outer face of the shell adjacent each slot, an angular guide on the inner face of each clamp member and projecting through the adjacent slot and a threaded segment carried by the guide and extending in a plane different from that of the clamp member, said threaded segment being adapted to engage and partially embrace a screw entering the tubular shell whereby the screw may be turned to advance the clamps toward the stop.

4. A fastener comprising a tubular shell having circumferentially spaced longitudinally extending slots, an outstanding annular flange at one end of the shell forming a stop against which work to be held is adapted to be engaged, a clamp member pivotally and slidably mounted on the outer face of the shell adjacent each slot, an angular guide on the inner face of each clamp member and projecting through the adjacent slot and a threaded segment carried by the guide and extending in a plane perpendicular to the clamp member.

5. A fastener comprising a tubular shell having circumferentially spaced longitudinally extending slots, an outstanding annular flange at one end of the shell forming a stop against which work to be held is adapted to be engaged, a clamp member pivotally and slidably mounted on the outer face of the shell adjacent each slot, an angular guide on the inner face of each clamp member and projecting through the adjacent slot and a threaded segment carried by the guide and extending in a plane perpendicular to the clamp member, said threaded segment being adapted to be engaged by a screw entering the tubular member from the end carrying the flange whereby the clamp members will be moved into a position perpendicular to the longitudinal axis of the shell and the threaded segments moved into a position to partially embrace the screw.

NORMAN L. GIDDEN.